US008577140B2

(12) United States Patent
Demandolx (10) Patent No.: US 8,577,140 B2
(45) Date of Patent: Nov. 5, 2013

(54) AUTOMATIC ESTIMATION AND CORRECTION OF VIGNETTING

(75) Inventor: Denis Demandolx, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 51 days.

(21) Appl. No.: 13/305,877

(22) Filed: Nov. 29, 2011

(65) Prior Publication Data

US 2013/0136355 A1    May 30, 2013

(51) Int. Cl.
*G06K 9/00*    (2006.01)

(52) U.S. Cl.
USPC ............................. 382/167; 382/162; 382/175

(58) Field of Classification Search
USPC .......... 382/162, 167, 275; 378/98.7; 356/338; 358/3.26, 3.27; 351/200; 348/E5.079; 396/125; 250/201.8
See application file for complete search history.

(56) References Cited

U.S. PATENT DOCUMENTS

| | | | |
|---|---|---|---|
| 5,434,902 A * | 7/1995 | Bruijns ........................ | 378/98.7 |
| 7,548,661 B2 | 6/2009 | Lin et al. | |
| 7,634,152 B2 | 12/2009 | Silverstein | |
| 7,920,171 B2 | 4/2011 | Hu | |
| 8,103,121 B2 * | 1/2012 | Agarwala et al. ............. | 382/275 |
| 2007/0211154 A1 | 9/2007 | Mahmoud et al. | |
| 2009/0021632 A1 | 1/2009 | Huggett | |
| 2009/0220169 A1 | 9/2009 | Bennett et al. | |
| 2009/0220469 A1 | 9/2009 | Bennett et al. | |

OTHER PUBLICATIONS

Zheng, et al., "Single-image Vignetting Correction", In Proceedings of IEEE Transactions on Pattern Analysis and Machine Intelligence, vol. 31, Issue 12, Oct. 31, 2008, pp. 2243-2256.
Lyu, Siwei, "Estimating Vignetting Function from a Single Image for Image Authentication", In Proceedings of the 12th ACM Workshop on Multimedia and Security, Sep. 9-10, 2010, pp. 3-12.
Goldman, Dan B, "Vignette and Exposure Calibration and Compensation", In Proceedings of IEEE Transactions on Pattern Analysis and Machine Intelligence, vol. 32, Issue 12, Dec. 2010, pp. 2276-2288.
Lanman, et al., "Modeling and Synthesis of Aperture Effects in Cameras", In Proceedings of Computational Aesthetics in Graphics, Visualization, and Imaging, 2008, 8pages.

* cited by examiner

*Primary Examiner* — Anh Do
(74) *Attorney, Agent, or Firm* — Wolfe-SBMC (57) ABSTRACT

Various embodiments pertain to image correction techniques that automatically estimate and correct vignetting based upon a single image. In various embodiments, a local gradient is estimated and the radial component of the gradient is ascertained. Radial components of gradients are correlated with a radius of the pixel from the optical center of the image, and can be utilized to estimate an attenuation due to vignetting. In some embodiments, a tangential component of a difference of gradients is also ascertained and correlated with the radius for use in estimating the attenuation. Attenuation due to vignetting can be calculated through the application of a polynomial regression to a plot of the radial components versus radius. In various embodiments, the image can be corrected by inverting the attenuation in the image.

20 Claims, 8 Drawing Sheets

AUTOMATIC ESTIMATION AND CORRECTION OF VIGNETTING

BACKGROUND

Vignetting, also referred to as lens falloff, is prevalent in photography. Vignetting refers to the phenomenon of brightness attenuation away from the center of the image due to, in part, the physical dimensions of the camera optic elements such as the effective focal length of the lens system. For example, foreshortening of the lens when viewed from increasing angles from the optical axis can lead to off-axis illumination falloff or the cosine fourth law of illumination falloff. Vignetting can also be geometric in nature. For example, light arriving at oblique angles to the optical axis can be partially obstructed by the rim of the lens.

To determine the vignetting effects in an image, various approaches can utilize calibration images captured by the same camera that captured the image being analyzed, a collection of overlapping images, or other means to gain information from pixels with equal scene radiance but differing attenuation of brightness. These approaches, however, can be ineffective for use on images captured with an unknown camera or downloaded from the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments describe image correction techniques that automatically estimate and correct vignetting based upon a single image. In various embodiments, a local gradient is estimated and the radial component of the gradient is ascertained. Radial components of gradients are correlated with a radius of a pixel from the optical center of the image, and can be utilized to estimate an attenuation due to vignetting. In some embodiments, a tangential component of a difference of gradients is also ascertained and correlated with the radius for use in estimating the attenuation. In various embodiments, the image can be corrected by inverting the attenuation in the image.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to image correction techniques that automatically estimate and correct vignetting based upon a single image. In various embodiments, a local gradient is estimated and the radial component of the gradient is ascertained. Radial components of gradients are correlated with a radius of a pixel from the optical center of the image, and can be utilized to estimate an attenuation due to vignetting. In some embodiments, a tangential component of a difference of gradients is also ascertained and correlated with the radius for use in estimating the attenuation. Attenuation due to vignetting can be calculated through the application of a polynomial regression to a plot of estimations of radial attenuation due to vignetting versus radius. In various embodiments, the image can be corrected by inverting the attenuation in the image.

In the discussion that follows, a section entitled "Example Operating Environment" describes an operating environment in accordance with one or more embodiments. Next, a section entitled "Example Embodiment" describes various embodiments that automatically estimate and correct vignetting based upon a single image.

A section entitled "Estimating Gradients" describes various embodiments of estimating a gradient based on a local gradient within an image. The section includes a subsection entitled "Estimation of Radial Components" that describes various embodiments of estimating a radial component of an estimated gradient, and a subsection entitled "Estimation of Tangential Components of the Differences of Gradients" that describes various embodiments of estimating a tangential component of a difference of two gradients estimated at two different angular positions for a given radius. The radial and tangential components can be utilized to estimate the gradient, and therefore an amount of vignetting, within the image. Finally, a section entitled "Example System" describes an example system that can be used to implement one or more embodiments.

Consider now, an example operating environment in accordance with one or more embodiments.

Example Operating Environment

Figure 1:
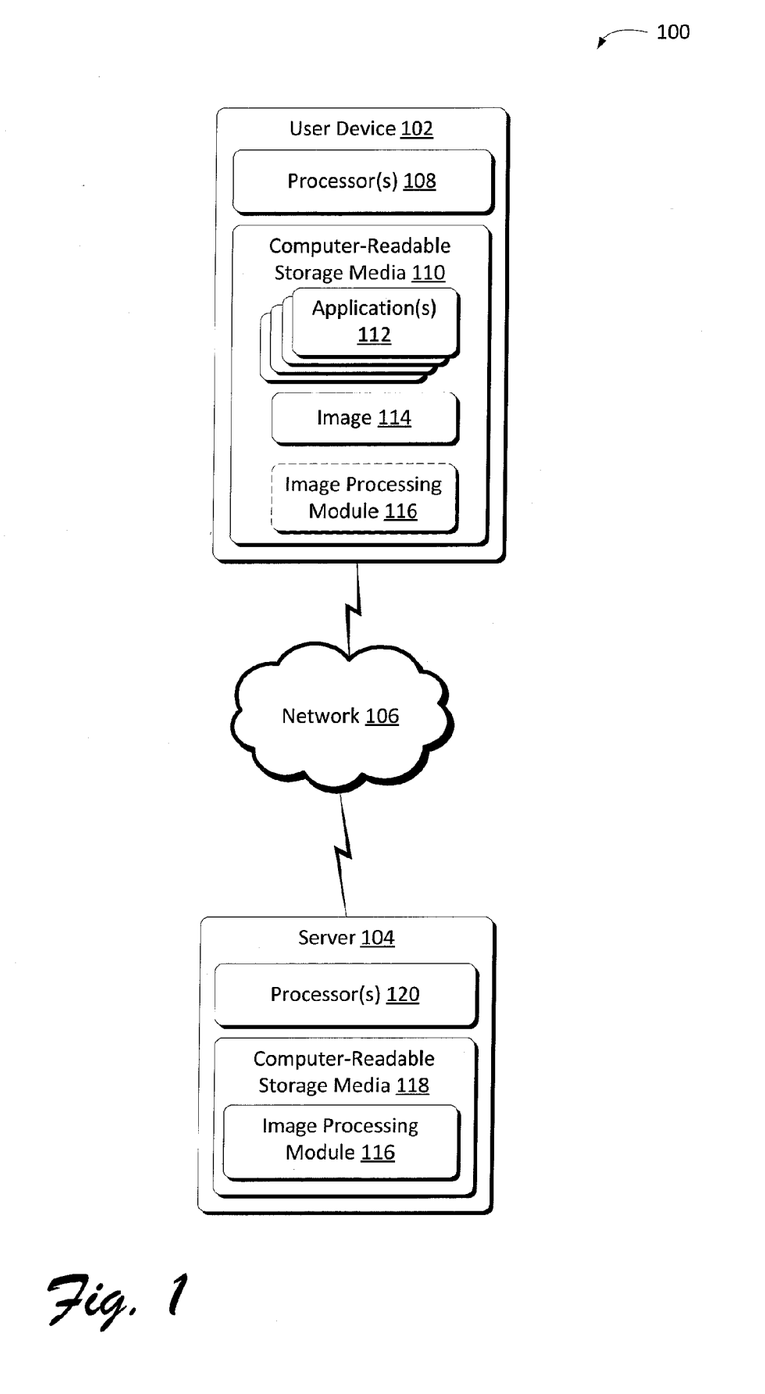
FIG. 1 illustrates an example environment in accordance with one or more embodiments.

FIG. 1 is an illustration of an example environment 100 in accordance with one or more embodiments. Environment 100 includes a user device 102 communicatively coupled to a server 104 through a network 106, such as the Internet. User device 102 can include one or more processors 108 and computer-readable storage media 110. User device 102 can be embodied as any suitable computing device such as, by way of example and not limitation, a desktop computer, a portable computer, a netbook, a handheld computer such as a personal digital assistant (PDA), a cell phone, and the like.

Computer-readable storage media 110 can include one or more applications 112, which can include software executables such as an operating system, web browser, or other applications. Computer-readable storage media 110 can also include one or more images, such as image 114. Image 114 can be an image that has been downloaded from another device, such as a camera, or from the Internet or some other network, or can be an image that was taken with user device 102. In various embodiments, a user can import image 114 into an executable or an application for image processing, such as image processing module 116, which optionally resides on computer-readable storage media 110 in addition to, or as an alternative to, residing on another device.

In the embodiment shown in FIG. 1, server 104 includes computer-readable storage media 118 on which image processing module 116 resides. Server 104 also includes one or more processors 120 that can execute the modules residing on computer-readable storage media 118. In some embodiments, the image processing module and the image reside on the same computer-readable storage media, or on the same device. For example, a user can upload an image to an image storage application that includes the image processing module or a user device can include the image processing module, as shown in FIG. 1.

In still other embodiments, image processing module 116 can reside on multiple devices in a distributed fashion, such as on server 104 and on user device 102, or on multiple servers. In such embodiments, image processing can be conducted across various devices. For example, one server can conduct one portion of the process, and another server can conduct another portion of the process.

Image processing module 116 can include various modules representing functionality useful for image editing and other processing. For example, image processing module can include tools for cropping, adjusting the brightness or color of an image, adding frames or other graphics, and the like. In particular, image processing module 116 is configured to automatically estimate vignetting attenuation and correct the image.

In one or more embodiments, image processing module 116 can be used to reduce vignetting attenuation according to an estimated vignetting gradient. For example, a direct gradient in the observed image can be broken down into a gradient due to image content and a gradient due to vignetting. In various embodiments, image processing module 116 can collect radial components of gradient, or attenuation, for brightness of pixels over every radius (e.g., distance from the center of the image) in the image. Then, for each radius, image processing module 116 can estimate the bias in radial gradient by using mean and median values of the local radial gradients. Next, image processing module 116 can apply at least one regression to the gradients estimated for each radius and integrate to estimate an attenuation value for the overall image. Additional details on estimating effects due to vignetting are provided below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

With an example environment in mind, consider now a discussion on how vignetting can be estimated and corrected in accordance with one or more embodiments.

Example Embodiment

In general, vignetting refers to brightness attenuation, $\theta$, away from the center of the image, and can be described as $$\text{observed image} = \theta * \text{true image}.$$

Once the attenuation function $\theta(r)$ is known (where r is the distance from the optical center of the image), the original image can be determined (or restored) by inversion of the attenuation function. To put it another way, $$\text{restored image} = \theta^{-1} * \text{observed image}.$$

In some embodiments, the problem is converted to a logarithmic representation of the image field $$\log(\text{observed image}) = \log(\theta) + \log(\text{true image})$$

to transform the multiplicative attenuation into an additive problem. In other words, the gradient in the logarithmic representation can be analyzed to identify a portion attributable to vignetting and a portion attributable to the image.

Theoretical vignetting can be modeled, according to the cosine fourth law of illumination falloff, as an attenuation function of the distance to the optical center according to the equation:

$$\vartheta(r) = \cos^4\theta$$

with $$\tan\theta = \frac{r}{f}$$

and $$\cos^2\theta = \frac{1}{(1+\tan^2\theta)}$$

where radius r is the distance from the optical center, $\theta$ is the off-axis angle, and f is the effective focal length of the camera. The equation can be reduced to:

$$\vartheta(r) = \frac{1}{\left(1+\left(\frac{r}{f}\right)^2\right)^2}$$

where $\theta(r)$ is the attenuation function, radius r is the distance from the optical center, and f is the effective focal length of the camera.

A Taylor series expansion of the above formula can be used to estimate what the attenuation function looks like. The Taylor series polynomial can be expressed as:

$$\vartheta(r) \cong 1 - \frac{2}{f^2}r^2 + \frac{3}{f^4}r^4 - \frac{4}{f^6}r^6 + \frac{5}{f^8}r^8 - \ldots$$

where $\theta(r)$ is the attenuation function, radius r is the distance from the optical center, and f is the effective focal length of the camera. In various embodiments, the attenuation function can be approximated and expressed as:

$$\theta(r) = 1 + a_2 r^2 + a_4 r^4 + a_6 r^6 + a_8 r^8$$

where $\theta(r)$ is the attenuation function, radius r is the distance from the optical center, and $a_2$, $a_4$, $a_6$, and $a_8$ are vignetting attenuation coefficients.

The attenuation function described above can be derived through image analysis. Once derived, a restored image can be generated by inverting the attenuation over the image.

Figure 2:
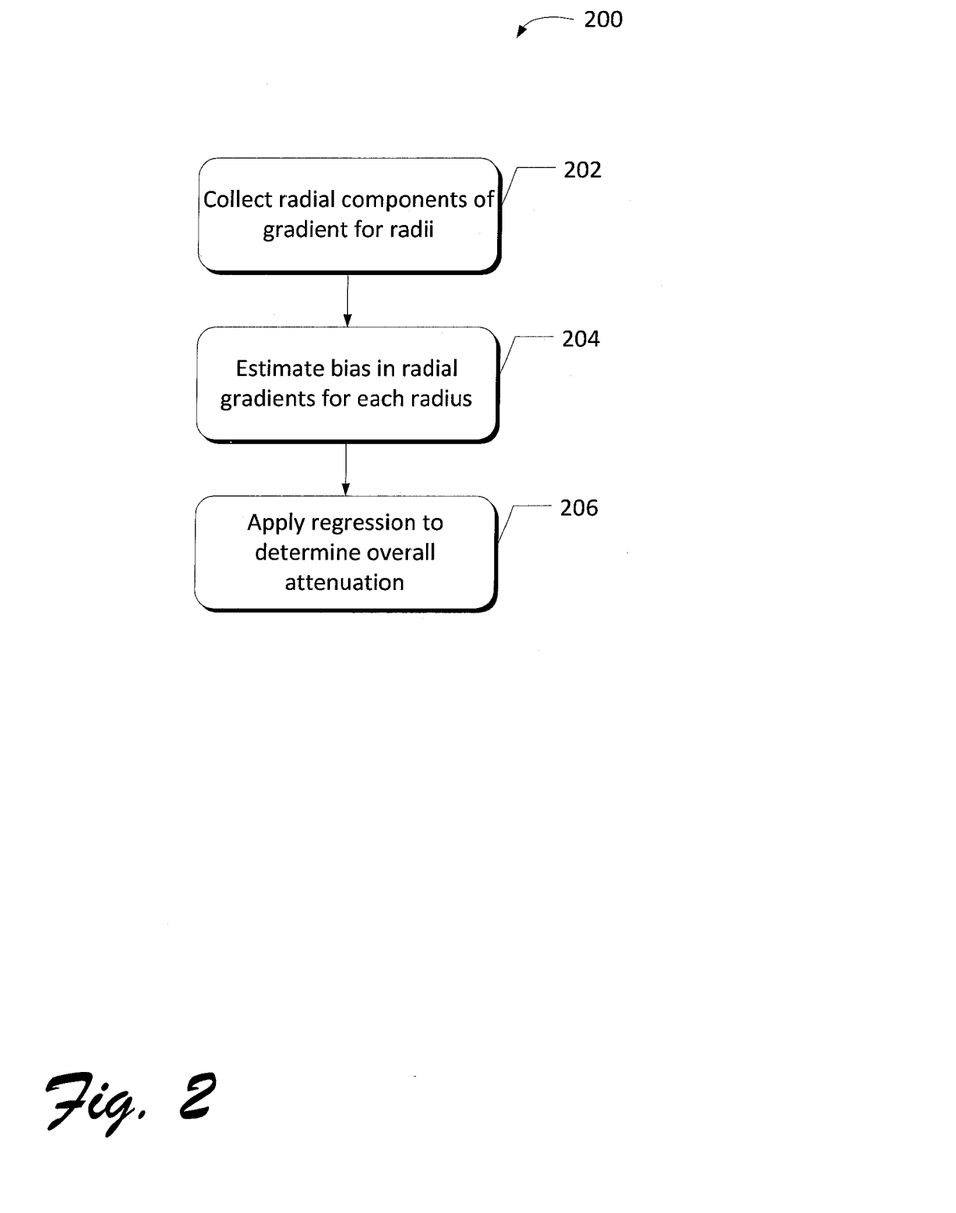
FIG. 2 is a flow diagram of an example process in accordance with one or more embodiments.

FIG. 2 illustrates an example process 200 for estimating attenuation in accordance with one or more embodiments. The process can be implemented in connection with any suitable hardware, software, firmware, or combination thereof. In at least some of the embodiments, the process can be implemented by a server, such as server 104, or a client device, such as user device 102.

Block 202 collects radial components of a gradient for radii in an image. This can be performed in any suitable way, examples of which are provided above and below. In various embodiments, a weighting factor can also be recorded. The weighting factor can increase when the gradient is radial and small. The application of a weighting factor enables gradients that are tangential and/or strong to be underweighted to account for such gradients commonly resulting from image content rather than vignetting.

Next, block 204 estimates the bias in radial gradients for each radius. This can be performed in any suitable way. For example, the bias can be estimated by using the median and mean averages of the recorded distribution of local radial gradients. In embodiments in which block 202 additionally records weighting factors, block 204 can estimate the bias for weighted and unweighted local gradients. In various embodiments, multiple estimates of bias are produced (e.g., median unweighted, median weighted, mean unweighted, and mean weighted), and the most conservative value (e.g., the smallest gradient in absolute value) is utilized as the bias for each radius for block 206.

Block 206 applies a regression to determine the overall attenuation. This can be performed in any suitable way. For example, in embodiments in which a logarithmic representation of the image field is used, a polynomial regression can be performed to fit the polynomial model of $$\frac{d\log\vartheta}{dr}$$

to the gradients estimated for each radius by block 204. The result can be integrated to obtain the absolute representation from the gradient, and converted from the logarithmic representation back to a linear representation.

Process 200 is an example of estimating the gradient bias caused by vignetting for every radial distance within an image. In various embodiments, to obtain information regarding gradients and radii, the image can be analyzed with reference to an example coordinate system $\langle \Omega | \vec{i} | \vec{j} \rangle$, such as is shown in FIG. 3.

Figure 3:
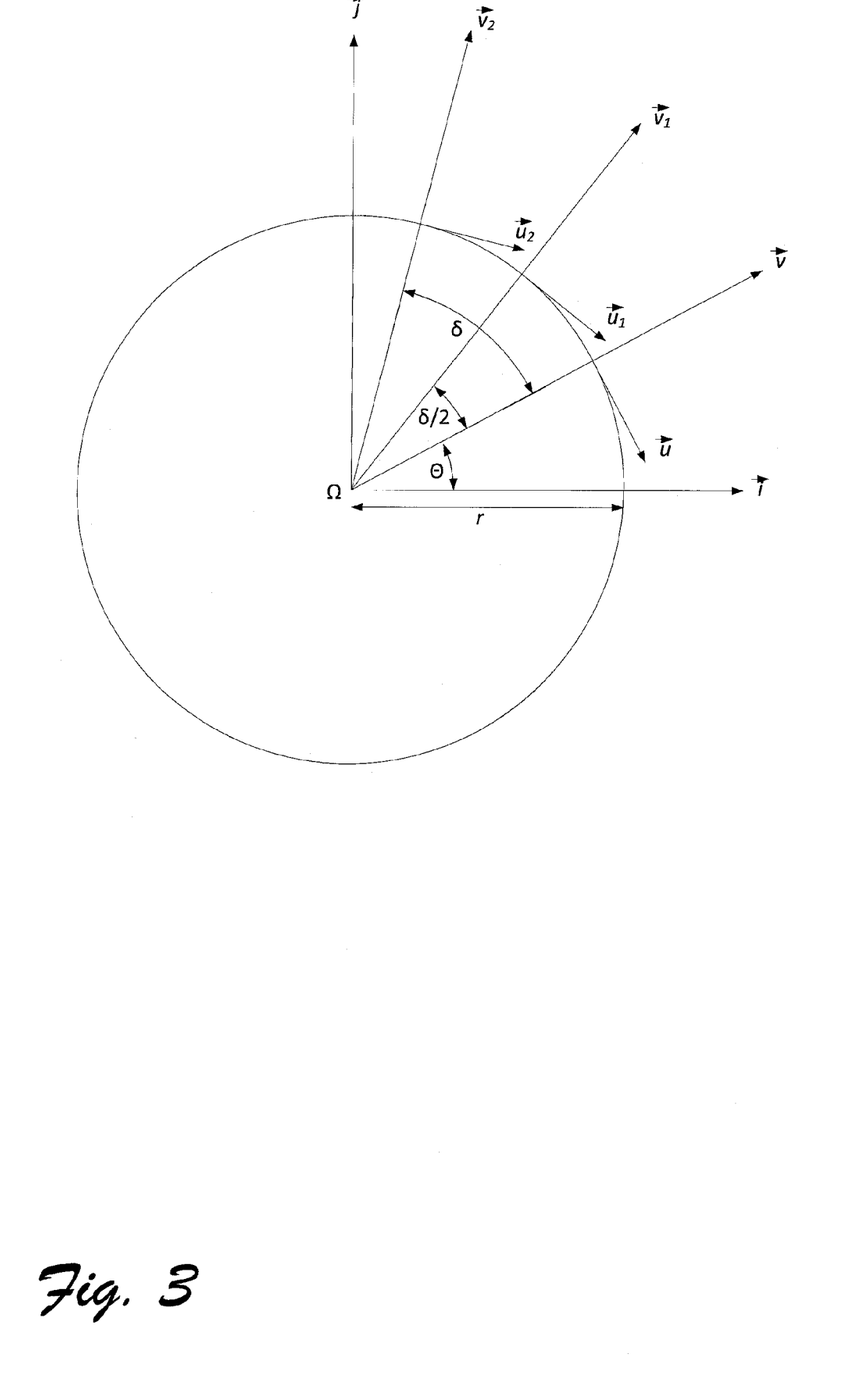
FIG. 3 illustrates an example coordinate system in accordance with one or more embodiments.

In FIG. 3, $\langle \Omega | \vec{i} | \vec{j} \rangle$ is the "regular" or Cartesian coordinate system with axes parallel to image borders; $\Omega$ marks the optical center of the image. Radius r denotes the distance of the pixel under consideration to the optical center $\Omega$. The vectors $\vec{i}$ and $\vec{j}$ are unit vectors of axes x and y, respectively (e.g., they indicate the orientation of the x and y axes). Vectors $\vec{u}, \vec{v}, \vec{u}_1, \vec{v}_1, \vec{u}_2,$ and $\vec{v}_2$ can be unit vectors defining coordinate systems $\langle \vec{u} | \vec{v} \rangle$, $\langle \vec{u}_1 | \vec{v}_1 \rangle$, and $\langle \vec{u}_2 | \vec{v}_2 \rangle$ rotated with respect to $\langle \vec{i} | \vec{j} \rangle$ by angles of $\theta$, $\theta+\delta/2$, and $\theta+\delta$, respectively. FIG. 3 can be used to aid in understanding various embodiments that are described above and below.

Figure 4:
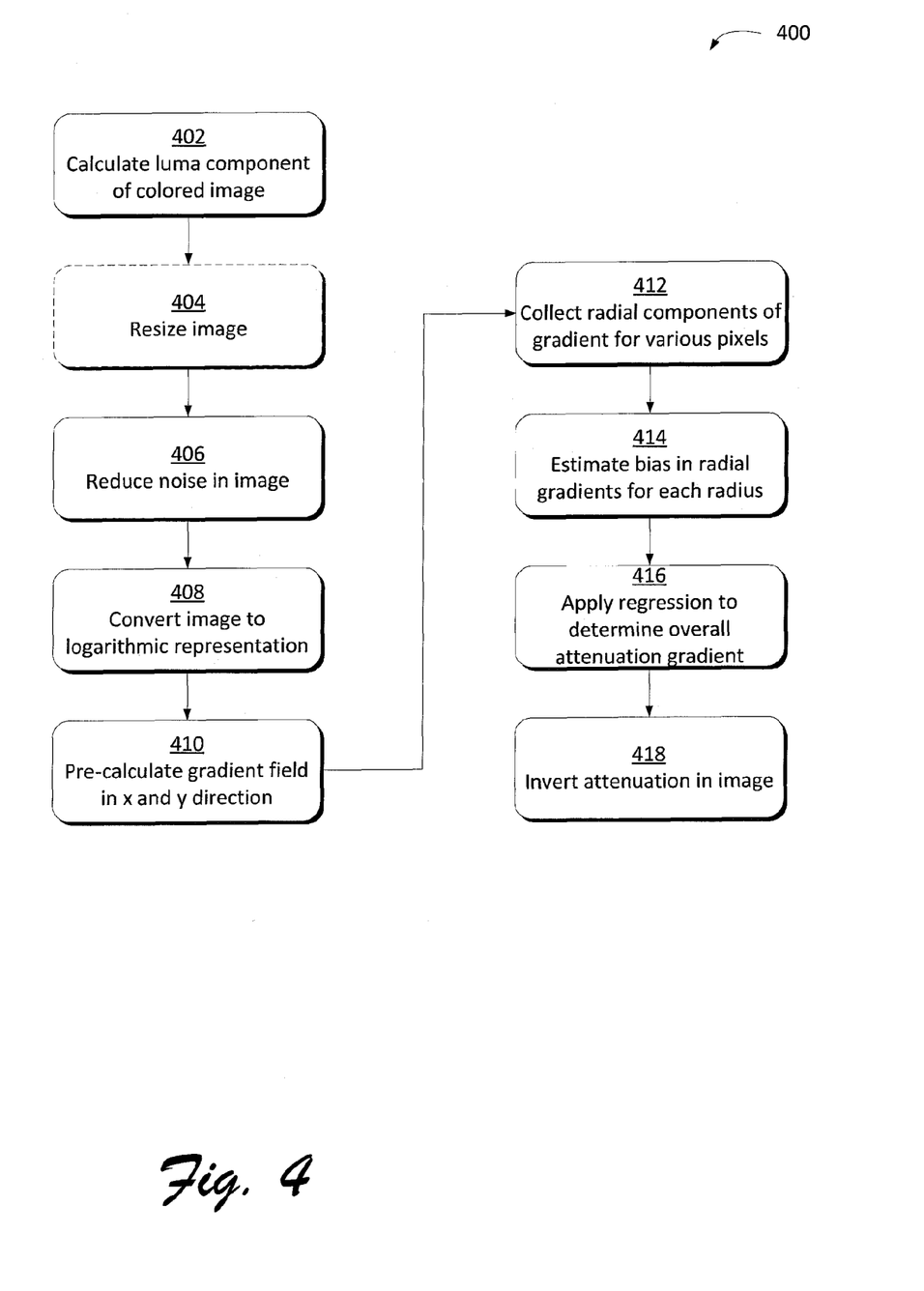
FIG. 4 is a flow diagram of an example process in accordance with one or more embodiments.

FIG. 4 illustrates an example process 400 for estimating attenuation in accordance with one or more embodiments. The process can be implemented in connection with any suitable hardware, software, firmware, or combination thereof. In at least some of the embodiments, the process can be implemented by a server, such as server 104, or a client device, such as user device 102.

Block 402 calculates a luma component of a colored image. This can be performed in any suitable way. For example, the luma component (Y) can be calculated for each pixel in the image according to the following equation:

$$Y=0.299R+0.587G+0.114B$$

where R, G, and B are the values of the red, green, and blue components of the pixel, respectively. Other equations can be used to calculate the luma component. For example, the luma component can be calculated according to the equations $$Y = \frac{(R+B+G)}{3}$$

or $$Y = \frac{(R+2G+B)}{4}$$

where R, G, and B are the values of the red, green, and blue components of the pixel, respectively, in each equation. In various examples, block 402 is omitted, and the luma component can be calculated from any multichannel (or multispectral) acquisition by estimating the modeled amount of energy received at pixel locations from the individual channels. In other words, any chromatic channel (e.g., R, G, or B) can be utilized individually or jointly to obtain the luma component.

Optionally, block 404 resizes the image. This can be performed in any suitable way. For example, a linear low-pass filter can be used to reduce images larger than 512×512, since vignetting field attenuation is smooth and does not contain high frequency details. In some embodiments, images can be resized by a factor of ½ until their largest dimension is less than or equal to 512 pixels. Other factors and maximum dimensions can be used to resize images, depending on the particular embodiment.

Block 406 reduces noise in the image. This can be performed in any suitable way. For example, the luma component of the image can be passed through an isotropic low-pass filter, such as a small Gaussian filter with a standard deviation set to one or two.

Next, block 408 converts the image to a logarithmic representation to make attenuation independent of image intensity. This can be performed in any suitable way. For example, the logarithmic values of the luma component for each pixel are calculated.

Block 410 pre-calculates the gradient field in the x and y direction. This can be performed in any suitable way. For example, for every pixel $P_{x,y}$ at position (x,y), the gradient can be represented according to an equation $$\overrightarrow{Gradient_{x,y}} = \begin{pmatrix} P_{x+1,y} - P_{x-1,y} \\ P_{x,y+1} - P_{x,y-1} \end{pmatrix}$$

where $P_{x+1,y}$, $P_{x-1,y}$, $P_{x,y+1}$, and $P_{x,y-1}$ are the values of the corresponding pixels relative to the pixel for which the local gradient is being calculated. In various embodiments, this can be done for each pixel in the image except for pixels along the edges of the image.

Next, block 412 collects radial components of the gradient for various pixels and classifies the radial components according to the radius. This can be performed in any suitable way, examples of which are provided above and below. For example, for each pixel in the image, starting at the top-left corner of the image, an estimation can be based on the gradient analysis of block 410. In some embodiments, weighting factors (denoted W) are also calculated and an overall weight $W_T$ is recorded with the estimate of the radial component of the gradient (denoted $\hat{A}$) at the pixel as a pair $\langle \hat{A}|W_T\rangle$. Each pair can be stored according to the radius r, where r is the distance of the pixel from the optical center of the image. In various embodiments, another estimate of the radial gradient (denoted $\hat{A}_2$) is calculated as the tangential component of differences of gradients and can be collected for various pixels and classified according to the radius, along with corresponding weighting factors yielding a corresponding total weight (denoted $W_{T2}$), and stored as pairs $\langle \hat{A}_2|W_{T2}\rangle$ according to the radius r.

Next, because radial components of the gradients and tangential components of the differences of gradients may be biased when the true image has true gradients (e.g., due to edges, illumination gradients, etc.), block 414 estimates a bias in the radial gradients collected for each radius. This can be performed in any suitable way. For example, the bias can be estimated by using the median and mean averages of the recorded distribution of local radial gradients. In embodiments in which block 412 additionally recorded weighting factors, block 414 can estimate the bias for weighted and unweighted local gradients. In other words, for each radius r, each pair $\langle \hat{A}|W_T\rangle$ (and $\langle \hat{A}_2|W_{T2}\rangle$) is used to calculate an estimated bias for the radius. In various embodiments, multiple estimates of bias are produced (e.g., median unweighted, median weighted, mean unweighted, and mean weighted), and the most conservative value (e.g., the smallest gradient in absolute value) is utilized as the estimated radial gradient caused by vignetting θ for the radius under consideration.

For each radius, in addition to an estimate of radial gradient caused by vignetting θ, a number of records that contributed to the estimation (e.g., a pixel count for radius r) and a sum of individual weights (e.g., a total weight for radius r) can be recorded.

Block 416 applies a regression to determine an overall attenuation gradient. This can be performed in any suitable way. For example, a polynomial regression can be performed to fit the polynomial model of $$\frac{d\log(\vartheta(r))}{dr}$$

to the gradients estimated for each radius by block 414. The attenuation function in the logarithmic representation can be modeled as an even polynomial according to an expression $$\log(\theta) = b_2 r^2 + b_4 r^4 + b_6 r^6 + b_8 r^8$$

where r is the radius. The corresponding derivative model, therefore can be represented by an expression $$A = \frac{d\log\vartheta}{dr} = a_1 r + a_3 r^3 + a_5 r^5 + a_7 r^7$$

where $a_1=2b_2$, $a_3=4b_4$, $a_5=6b_6$, and $a_7=8b_8$. The values collected by block 414 correspond to estimated values of the derivative (gradient) of the Log(attenuation) for each radius. The values for each radius can be plotted, and a polynomial regression can be fitted to the points to obtain coefficients $a_1$, $a_3$, $a_5$, and $a_7$. In various embodiments, another regression is performed using weights for each radius. The weight for the pixel samples at radius r can be represented by an expression $$W_r = \frac{W_{Tr}}{\sqrt{n_r+1}}$$

where $W_r$ is the weight for the pixel samples at radius r, $W_{Tr}$ is the total weight for radius r, and $n_r$ is the pixel count for radius r. Integration of the polynomial approximating the values of the derivative (gradient) gives corresponding values for $b_2$, $b_4$, $b_6$, and $b_8$, a value for each from the weighted and unweighted regressions.

Figure 5:
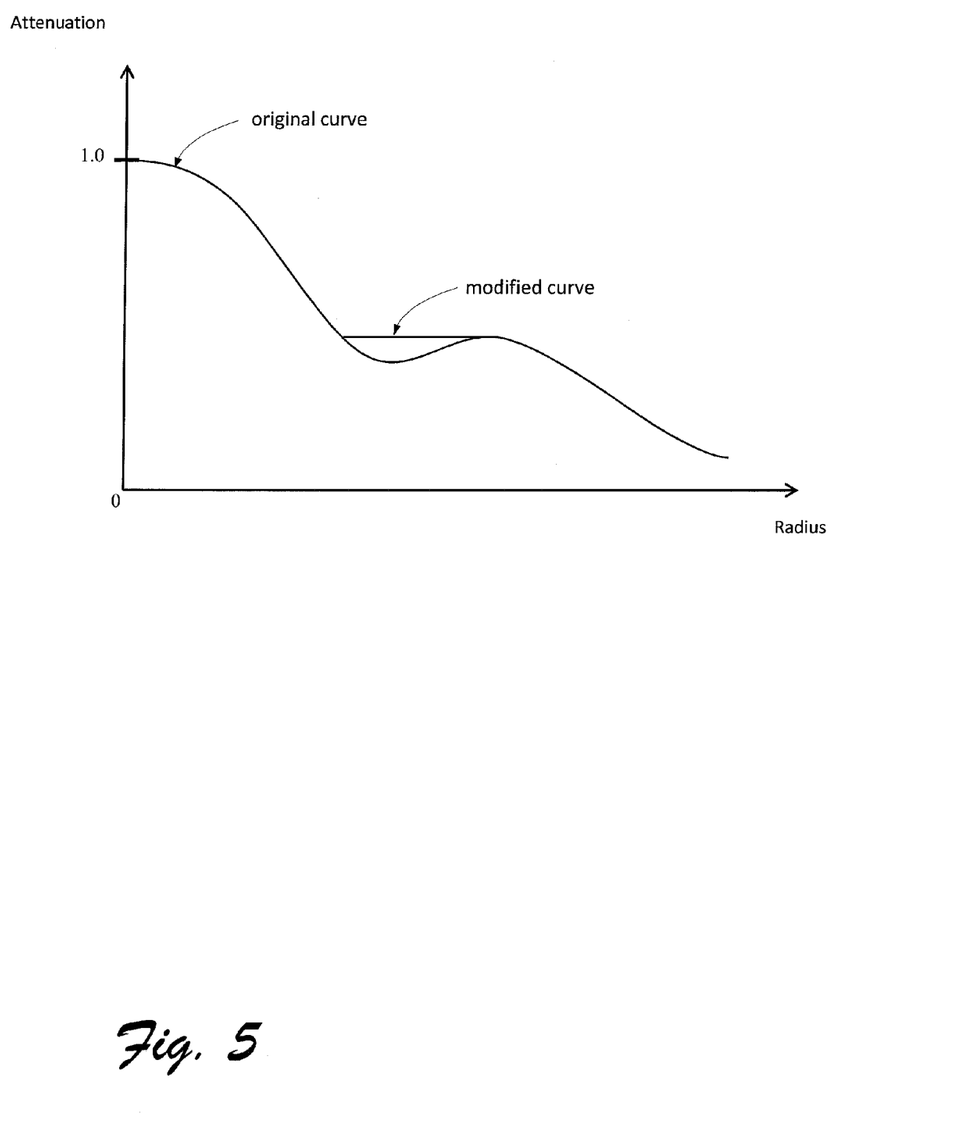
FIG. 5 illustrates an example polynomial regression analysis with monotony enforcement in accordance with one or more embodiments.

For each radius, the values of the polynomials can be converted from the logarithmic representation to the linear representation and the attenuation value closer to one (e.g., the more conservative value) is retained. The attenuation can be clamped between 0 and 1, and monotony, with respect to radius r of the set of points, can be enforced. FIG. 5 depicts an example plot in which the attenuation has been clamped and a portion of the curve has been modified to enforce monotony.

From the chart of clamped linear values, another non-weighted polynomial regression can be applied to obtain coefficients of a polynomial. The polynomial can be represented by an expression $$\theta = 1 + c_2 r^2 + c_4 r^4 + c_6 r^6 + c_8 r^8$$

where θ is the overall estimated attenuation at radius r.

Finally, block 418 inverts the attenuation in the image utilizing the attenuation field formula. This can be done in any suitable way. For example, the observed value for each pixel can be divided by the estimated attenuation to yield the estimated true pixel. The inversion can be performed for each channel (e.g., the R, G, and B channels) of the image.

The embodiments described above derive an overall amount of attenuation from gradients estimated for each radius within an image. Consider now the following description of estimating gradients caused by vignetting attenuation.

Estimating Gradients

Various embodiments described above and below analyze information regarding radial components of the gradient as well as tangential components of the differences of gradients. In the discussion that follows, estimation of radial components of gradients will be described first, followed by a description of estimating tangential components of the differences of gradients.

In the description that follows, assume that the position of the pixel being analyzed can be represented according to an expression $$\vec{P} = \begin{pmatrix} x \\ y \end{pmatrix} = \begin{pmatrix} r\cos\theta \\ r\sin\theta \end{pmatrix} = x\vec{i} + y\vec{j}$$

where $\vec{P}$ is the position of the current pixel on the $\langle \Omega | \vec{i} | \vec{j} \rangle$ coordinate system where Ω is the optical center of the image and where r is the radius from the optical center of the image, θ is the angle of rotation, and x and y are the coordinates of the position of the current pixel on a Cartesian coordinate system $\langle \Omega | \vec{i} | \vec{j} \rangle$.

Estimation of Radial Components

Figure 6:
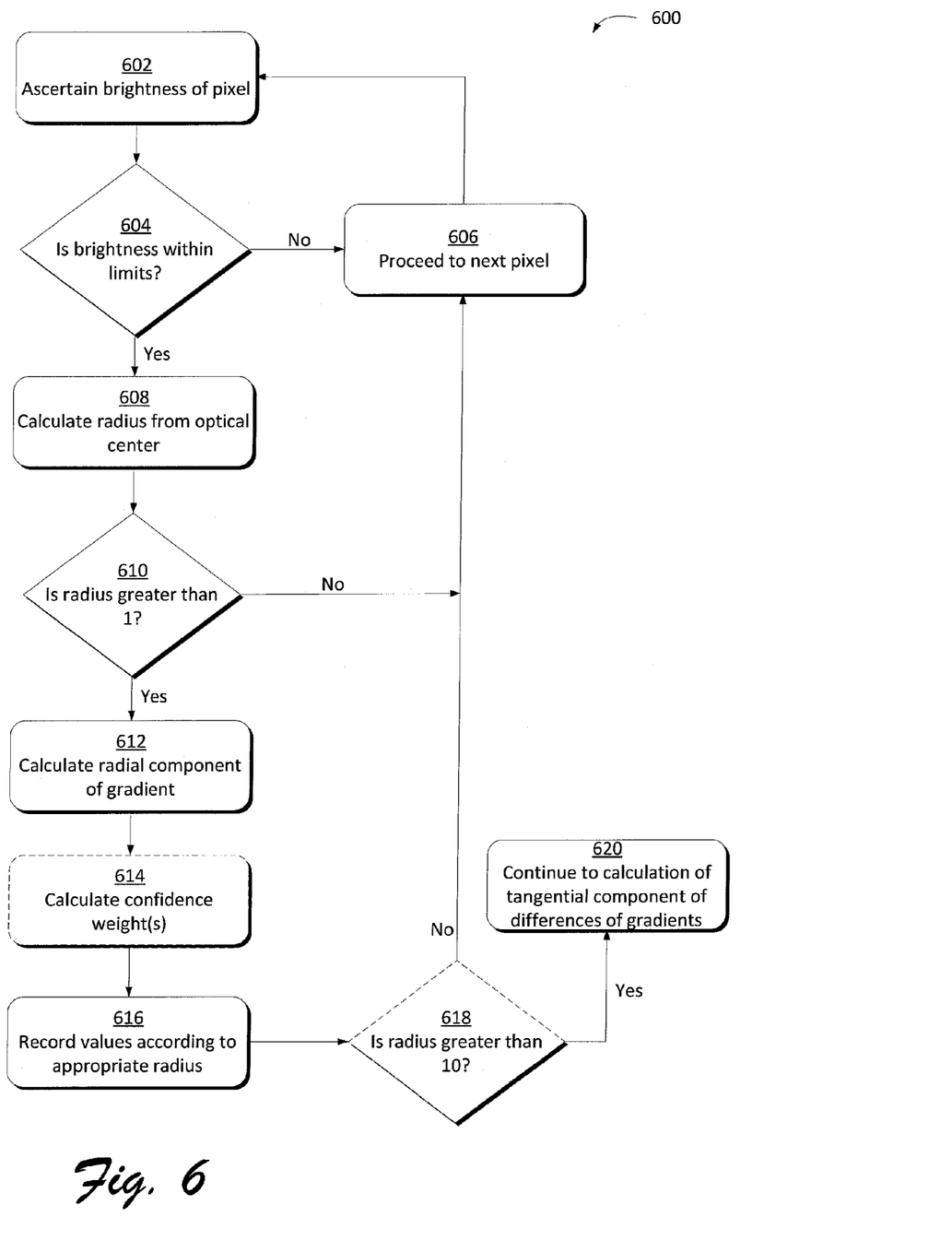
FIG. 6 is a flow diagram of an example process in accordance with one or more embodiments.

FIG. 6 illustrates an example process 600 of estimating radial components of gradients. The process can be implemented in connection with any suitable hardware, software, firmware, or combination thereof. In at least some of the embodiments, the process can be implemented by a server, such as server 104, or a client device, such as user device 102.

Block 602 ascertains the brightness of the pixel being analyzed. This can be performed in any suitable way. In various embodiments, the gradient at one or more pixels is not calculated because the pixel is too bright or too dark. Therefore, block 604 determines whether the brightness of the pixel is within pre-determined limits. This can be performed in any suitable way. For example, threshold values between 0 and 255 for the value of the pixel can be selected depending on the embodiment, and pixels having values above the upper threshold or below the lower threshold can be ignored.

If the brightness of the pixel is not within the limits, or within the threshold values, block 606 proceeds to the next pixel and returns to block 602 to ascertain the brightness of the next pixel.

If, however, the brightness is within the pre-determined limits, block 608 calculates a radius from the optical center of the image to the pixel. This can be performed in any suitable way. For example, the radius r can be derived according to an expression $$r = \sqrt{x^2 + y^2}$$

where x and y are the location of the pixel on a Cartesian coordinate system $\langle \Omega | \vec{i} | \vec{j} \rangle$.

Block 610 ascertains whether the radius is greater than one. The radius threshold can vary depending on the embodiment, and the radius threshold can be selected according to a tolerance. The radius threshold enables certain pixels close to the center of the image to be ignored since the effect due to vignetting is assumed to be null at and near the optical center of the image.

If the radius is less than 1 (or another selected radius threshold), block 606 proceeds to the next pixel since the effect due to vignetting is assumed to be null at and near the optical center of the image.

If the radius is greater than the threshold, e.g., one, block 612 calculates the radial component of the gradient. This can be done in any suitable way. For example, the pre calculated gradient field in the x and y direction (e.g., such as calculated in block 410) can be used to derive the radial component of the observed gradient. The radial component of the observed gradient can serve as a local estimate of the vignetting gradient according to an expression $$\hat{A} = \vec{v_0} \cdot \vec{G}$$

where Â is the local estimate of the vignetting gradient in the log domain, $\vec{v_0}$ is the radial unit vector, and $\vec{G}$ is the pre-calculated gradient vector at the pixel. The radial component representing an estimated amount of the gradient due to vignetting, $\vec{A}$, is recorded for each pixel in the image that has not been skipped (e.g., because the pixel is too light, too dark, or too close to the optical center of the image).

Next, optional block 614 calculates various confidence weights that are recorded in addition to the amount of vignetting. This can be performed in any suitable way. Confidence weights can include, by way of example and not limitation, weights for directionality, smoothness, and an overall confidence weight. The weight for directionality, $W_D$, can be calculated according to an expression $$W_D = \frac{\hat{A}}{\|\vec{G}\|}$$

where $\vec{A}$ is the local radial gradient in the log domain and $\vec{G}$ is the pre-calculated gradient vector at the pixel. For example, the weight for directionality can be 1 if the gradient is in a radial direction, and 0 if the gradient is in a tangential direction. The weight for smoothness, $W_S$, can be calculated according to an expression $$W_S = \frac{1}{(\|\vec{G}\| + \text{offset})}$$

where a higher $W_S$ corresponds to a smoother gradient and where offset is a small additive value to prevent division by zero. In some embodiments, offset can be equal to the smallest non-null gradient $\|\vec{G}\|$ in the image. The overall confidence weight, $W_T$, can be represented by an expression $$W_T = W_D * W_S$$

where $W_D$ is the weight for directionality and $W_S$ is the weight for smoothness of the pixel. In embodiments not including optional block 614, the process proceeds directly to block 616.

Block 616 records values according to the appropriate radius. This can be done in any suitable way. For example, each pair $\langle \hat{A} | W_T \rangle$ is added to the statistics for a given radius r.

In various embodiments, optional block 618 determines whether the radius calculated at block 608 is greater than 10 since when the radius is greater than about 10, the difference of gradient can additionally be considered to enhance the estimation of the gradient originating from vignetting. A value other than 10 can be selected, depending on the particular embodiment and the tolerance. If the radius is not greater than 10, block 606 proceeds to the next pixel. If, however, the radius is greater than 10, block 620 continues to the calculation of the tangential component of the difference of gradients. In embodiments not including optional block 618, the process proceeds directly to block 606 and continues on to the next pixel.

Estimation of Tangential Components of the Differences of Gradients

Figure 7:
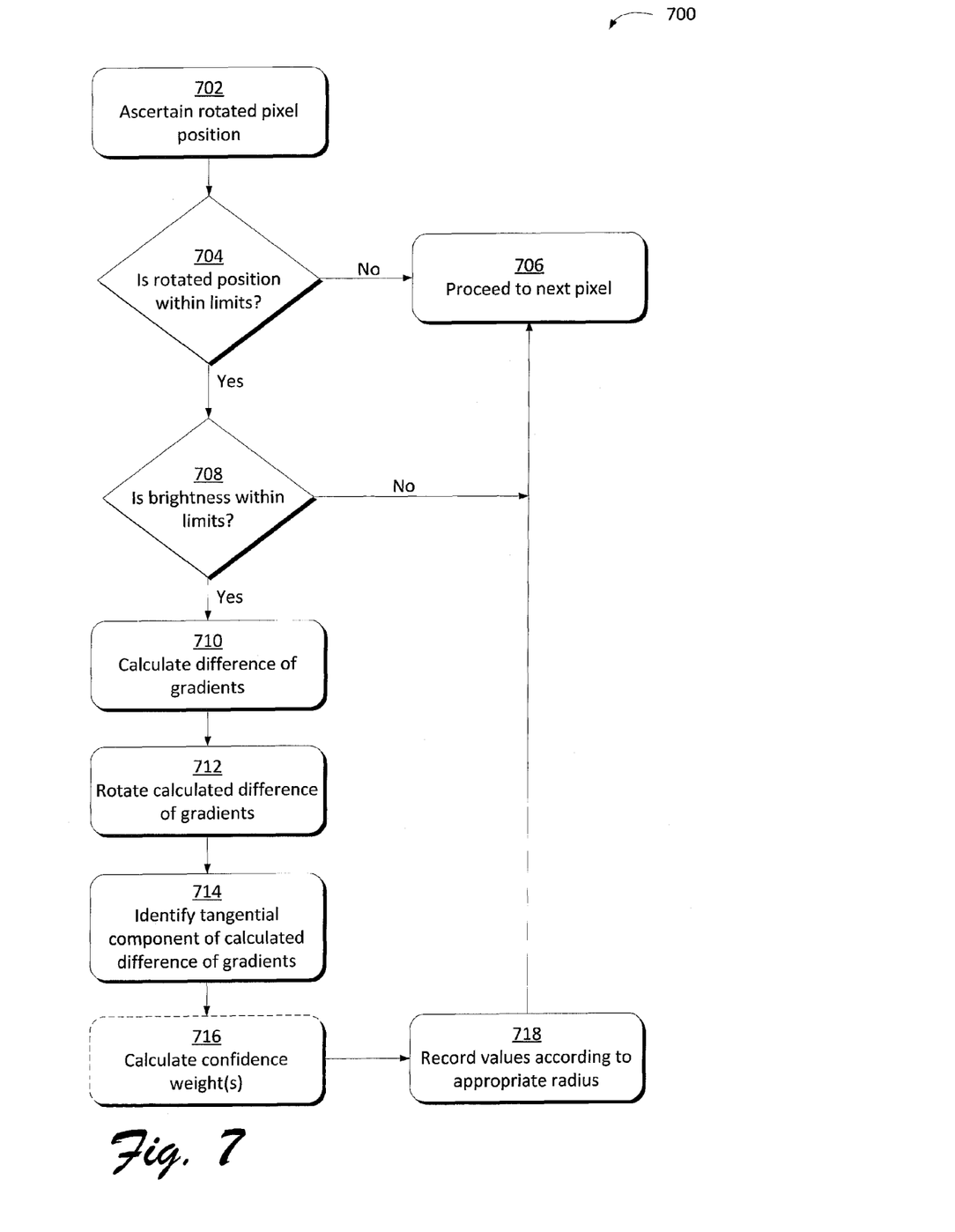
FIG. 7 is a flow diagram of an example process in accordance with one or more embodiments.

FIG. 7 illustrates an example process 700 of estimating tangential components of the differences of gradients. The process can be implemented in connection with any suitable hardware, software, firmware, or combination thereof. In at least some of the embodiments, the process can be implemented by a server, such as server 104, or a client device, such as user device 102.

Block 702 ascertains a rotated pixel position. This can be done in any suitable way. For example, assume that the pixel at position $\vec{P_2}$ is rotated by angle δ from initial position $\vec{P}$ with a vertex at Ω, the optical center of the image. In other words, $$\vec{P_2} = \begin{pmatrix} x_2 \\ y_2 \end{pmatrix} = \begin{pmatrix} r\cos(\theta + \delta) \\ r\sin(\theta + \delta) \end{pmatrix} = \text{rotation}_{\Omega, \delta}(\vec{P})$$

where δ is the angle of rotation between $\vec{P}$ and $\vec{P_2}$, and $x_2$ and $y_2$ are the coordinates of the position of the pixel $\vec{P_2}$ on a Cartesian coordinate system $\langle \Omega | \vec{i} | \vec{j} \rangle$. In various embodiments, angle δ is an angle such that it is small enough to increase the likelihood that position $\vec{P}$ and position $\vec{P_2}$ are in the same area of the image, but large enough that the corresponding radial directions are sufficiently distinguishable. For example, in various embodiments $$\delta = \frac{\pi}{12}.$$

Block 704 determines if the rotated position $\vec{P}_2$ is within the limits of the image. This can be performed in any suitable way. If the position $\vec{P}_2$ is outside the bounds of the image (e.g., it is outside the border), block 706 proceeds to the next pixel. For example, the next pixel can be analyzed according to process 600.

If the pixel at position $\vec{P}_2$ is within the limits of the image, block 708 ascertains if the brightness of the pixel at position $\vec{P}_2$ is within the limits. This can be performed in any suitable way, examples of which are provided above. If the value of the pixel at position $\vec{P}_2$ is too dark or too bright, as described above, the difference of gradient is not considered, and block 706 proceeds to the next pixel.

If, however, the pixel at position $\vec{P}_2$ is within the limits for consideration, block 710 calculates a difference of gradients. This can performed in any suitable way. For example, the difference of gradients can be calculated according to an expression $$L\langle\vec{i}|\vec{j}\rangle = \vec{G} - \vec{G}_2$$

where $L\langle\vec{i}|\vec{j}\rangle$ is the difference of gradients in the $\langle\vec{i}|\vec{j}\rangle$ coordinate system, $\vec{G}$ is the gradient vector at the pixel at position $\vec{P}$, and $\vec{G}_2$ is the gradient vector at position $\vec{P}_2$.

Next, block 712 rotates the calculated difference of gradients calculated at block 710. This can be done in any suitable way. For example, the resultant difference of gradients can be expressed in the $\langle\vec{u}_1|\vec{v}_1\rangle$ coordinate system. For example, the result can be calculated according to an expression $$L_{\langle\vec{u}_1|\vec{v}_1\rangle} = \begin{pmatrix} L_{u_1} \\ L_{v_1} \end{pmatrix} = \begin{pmatrix} \sin(\theta+\delta/2) & -\cos(\theta+\delta/2) \\ \cos(\theta+\delta/2) & \sin(\theta+\delta/2) \end{pmatrix} L_{\langle\vec{i}|\vec{j}\rangle}$$

where $L\langle\vec{i}|\vec{j}\rangle$ is the difference of gradients in the $\langle\vec{i}|\vec{j}\rangle$ coordinate system, $(\theta+\delta/2)$ is the angle of rotation between $\langle\vec{i}|\vec{j}\rangle$ and $\langle\vec{u}_1|\vec{v}_1\rangle$, and $L\langle\vec{u}_1|\vec{v}_1\rangle$ is the difference of gradients expressed in the $\langle\vec{u}_1|\vec{v}_1\rangle$ coordinate system.

Block 714 identifies the tangential component of the calculated difference of gradients. This can be performed in any suitable way. For example, the tangential component of the calculated difference of gradients can represent a local estimate of the radial gradient caused by vignetting. At angle $\theta$, gradient originating from vignetting is $$G_\theta = \begin{pmatrix} A\cos\theta \\ A\sin\theta \end{pmatrix}$$

in the $\langle\vec{i}|\vec{j}\rangle$ coordinate system and $$G_\theta = \begin{pmatrix} A\sin\left(\frac{\delta}{2}\right) \\ A\cos\left(\frac{\delta}{2}\right) \end{pmatrix}$$

in the $\langle\vec{u}_1|\vec{v}_1\rangle$ coordinate system, where A is the radial gradient due to vignetting. At angle $(\theta+\delta)$, gradient originating from vignetting can be represented as $$G_{\theta+\delta} = \begin{pmatrix} A\cos(\theta+\delta) \\ A\sin(\theta+\delta) \end{pmatrix}$$

in the $\langle\vec{i}|\vec{j}\rangle$ coordinate system and $$G_{\theta+\delta} = \begin{pmatrix} -A\sin\left(\frac{\delta}{2}\right) \\ A\cos\left(\frac{\delta}{2}\right) \end{pmatrix}$$

in the $\langle\vec{u}_1|\vec{v}_1\rangle$ coordinate system. Therefore, the difference in gradients caused by vignetting is $$G_\theta - G_{\theta+\delta} = \begin{pmatrix} A\sin\left(\frac{\delta}{2}\right) \\ A\cos\left(\frac{\delta}{2}\right) \end{pmatrix} - \begin{pmatrix} -A\sin\left(\frac{\delta}{2}\right) \\ A\cos\left(\frac{\delta}{2}\right) \end{pmatrix} = \begin{pmatrix} 2A\sin\left(\frac{\delta}{2}\right) \\ 0 \end{pmatrix}$$

in the $\langle\vec{u}_1|\vec{v}_1\rangle$ coordinate system.

The observed difference of gradients can be represented as:

$$L_{\langle\vec{u}_1|\vec{v}_1\rangle} = \begin{pmatrix} 2A\sin\left(\frac{\delta}{2}\right) \\ 0 \end{pmatrix} + \Delta G$$

where $\Delta G$ is the difference of gradient due to image content. Assuming $\Delta G$ is small, because $\vec{P}$ and $\vec{P}_2$ are in the same region of the image, the observed difference of gradients can be estimated as $$L_{\langle\vec{u}_1|\vec{v}_1\rangle} = \begin{pmatrix} 2A\sin\left(\frac{\delta}{2}\right) \\ 0 \end{pmatrix}$$

which leads to a difference of gradients that is tangential in the $\langle\vec{u}_1|\vec{v}_1\rangle$ coordinate system. From this, the radial gradient caused by vignetting can be calculated according to an expression:

$$\hat{A}_2 = \frac{L_{u_1}}{\left(2\sin\left(\frac{\delta}{2}\right)\right)}$$

where $\hat{A}_2$ is the amount of radial vignetting estimated from the difference of gradient, assuming that the image content is only responsible for a uniform gradient locally (the rest of the gradient coming from vignetting), $L_{u_1}$ is the tangential component of the observed difference of gradients in the $\langle \vec{u}_1 | \vec{v}_1 \rangle$ coordinate system.

In some embodiments, optional block 716 calculates various confidence weights. This can be performed in any suitable way. For example, confidence weights can include, by way of example and not limitation, weights for directionality, smoothness, and an overall confidence weight. The weight for directionality, $W_{D2}$, can be calculated according to an expression $$W_{D2} = \frac{L_{u_1}}{\|\vec{L}\|}$$

where $L_{u_1}$ is the tangential component of the observed difference of gradients in the $\langle \vec{u}_1 | \vec{v}_1 \rangle$ coordinate system and $\vec{L}$ is the observed difference of gradients in the $\langle \vec{u}_1 | \vec{v}_1 \rangle$ coordinate system. For example, the weight for directionality can be zero if the difference of gradients $\vec{L}$ is in a radial direction and one if the difference of gradients is in a tangential direction. The weight for smoothness, $W_{S2}$, can be calculated according to an expression $$W_{S2} = \frac{1}{(\max(\|\vec{G}_1\|, \|\vec{G}_2\|) + \text{offset})}$$

where a higher $W_{S2}$ corresponds to a smoother gradient and where offset is a small additive value to prevent division by zero. In some embodiments, offset can be equal to the smallest non-null gradient $\|\vec{G}\|$ in the image. The overall confidence weight, $W_{T2}$, can be represented by an expression $$W_{T2} = W_{D2} * W_{S2}$$

where $W_{D2}$ is the weight for directionality and $W_{S2}$ is the weight for smoothness of the pixel at position $\vec{P}_2$. In embodiments not including optional block 716, the process proceeds directly to block 718.

Block 718 records values according to the appropriate radius. This can be performed in any suitable way. For example, each pair $\langle \hat{A}_2 | W_2 \rangle$ is added to the statistics for a given radius r. Once the values have been recorded, block 706 proceeds to the next pixel for processing.

Figure 8:
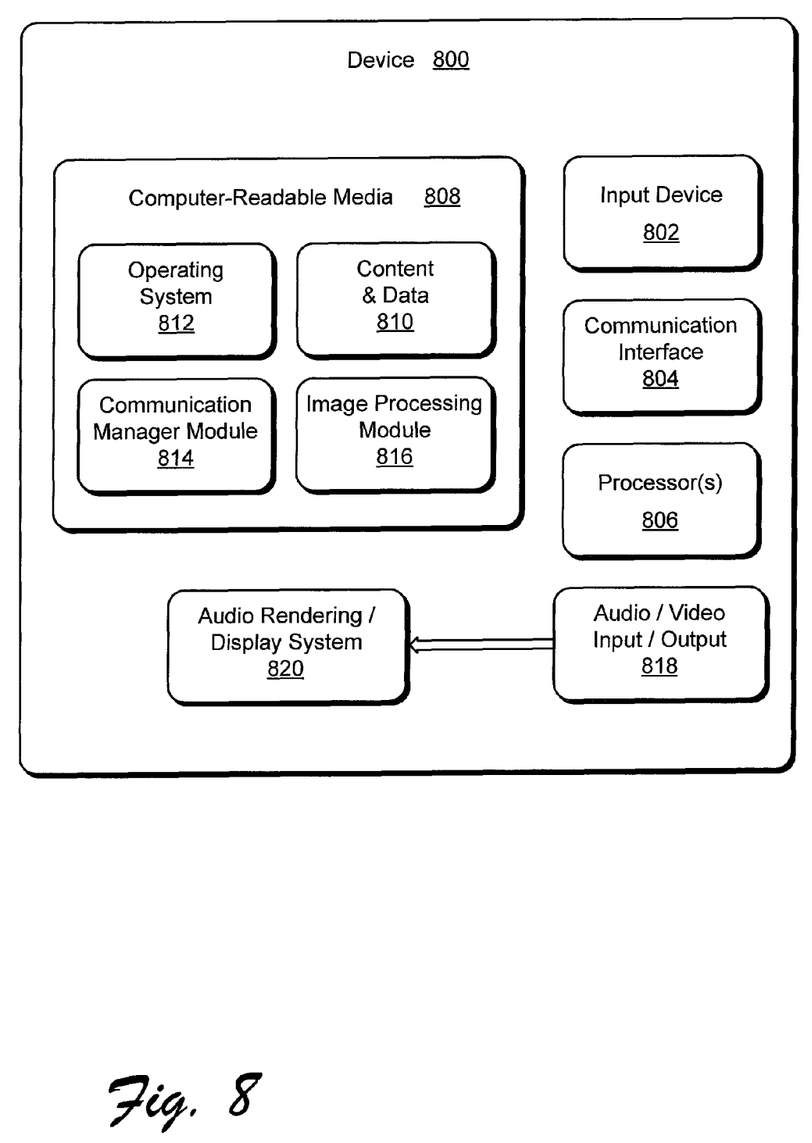
FIG. 8 illustrates an example system that can be used to implement one or more embodiments.

Having described various embodiments of automatically estimating and correcting a vignetting amount from a single image, consider now a discussion describing a system that can be used to implement one or more embodiments Example System FIG. 8 illustrates various components of an example device 800 that can practice the embodiments described above. In one or more embodiments, device 800 can be implemented as a client device, such as client or user device 102 in FIG. 1. Device 800 can also be implemented as a server, such as server 104 in FIG. 1.

Device 800 includes input device 802 that may include Internet Protocol (IP) input devices as well as other input devices, such as a keyboard. Device 800 further includes communication interface 804 that can be implemented as any one or more of a wireless interface, any type of network interface, and as any other type of communication interface.

A network interface provides a connection between device 800 and a communication network by which other electronic and computing devices can communicate data with device 800. A wireless interface can enable device 800 to operate as a mobile device for wireless communications.

Device 800 also includes one or more processors 806 (e.g., any of microprocessors, controllers, and the like) which process various computer-executable instructions to control the operation of device 800 and to communicate with other electronic devices. Device 800 can be implemented with computer-readable media 808, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 808 provides data storage to store content and data 810, such as an image 114, as well as device executable modules and any other types of information and/or data related to operational aspects of device 800. One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 812 can be maintained as a computer executable module with the computer-readable media 808 and executed on processor 806. Device executable modules can also include a communication manager module 814 and an image processing module 816 that operates as described above and below. Image processing module 816 can be, for example, image processing module 116 as described above and below.

Device 800 also includes an audio and/or video input/output 818 that provides audio and/or video data to an audio rendering and/or display system 820. The audio rendering and/or display system 820 can be implemented as integrated component(s) of the example device 800, and can include any components that process, display, and/or otherwise render audio, video, and image data.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method comprising:
receiving, by a computing device, an image;
converting, using the computing device, the image to a logarithmic representation; and
automatically calculating, using the computing device, a vignetting amount based on radial components of gradients collected from the logarithmic representation of the image.

2. The computer-implemented method of claim 1, further comprising:
inverting an attenuation corresponding to the vignetting amount in the image; and
outputting a corrected image.

3. The computer-implemented method of claim 1, wherein the image is an RGB image, the method further comprising:
converting the RGB image into a representation including a luma component, the luma component being utilized to automatically calculate the vignetting amount.

4. The computer-implemented method of claim 1, further comprising:
applying a low-pass filter effective to reduce noise within the image prior to automatically calculating the vignetting amount.

5. The computer-implemented method of claim 1, automatically calculating a vignetting amount based on radial components of gradients comprising:
collecting radial components of an observed gradient for a plurality of radii, each of the plurality of radii corresponding to a distance of a pixel in the image from an optical center of the image;
estimating a bias in radial gradients for each of the plurality of radii; and
applying a regression effective to determine an overall attenuation corresponding to the vignetting amount.

6. The computer-implemented method of claim 5, collecting radial components comprising:
estimating the observed gradient by pre-calculating a local gradient at a plurality of pixels in the image;
calculating a value of the radial component of the observed gradient; and
recording the value of the radial component according to each of the plurality of radii of each of the plurality of pixels.

7. The computer-implemented method of claim 6, collecting radial components further comprising:
ascertaining a rotated pixel position corresponding to an initial position of one of the plurality of pixels, the initial position and rotated pixel position being in a first coordinate system;
calculating a difference of gradients, the difference of gradients being a difference between the observed gradient at the initial position of the one of the plurality of pixels and an observed gradient at the rotated pixel position;
rotating the calculated difference of gradients to be in a second coordinate system;
identifying a value of a tangential component of the calculated difference of gradients in the second coordinate system; and
recording the value of the tangential component with the recorded value of the radial component according to one of the plurality of radii of the one of the plurality of pixels for use in estimating the bias of each of the plurality of radii.

8. The computer-implemented method of claim 7, further comprising:
calculating at least one of a weight for directionality, a weight for smoothness, or an overall weight for each tangential component;
wherein recording the value of the tangential component comprises recording the at least one weight with the value of the tangential component as a pair according to each of the plurality of radii of each of the plurality of pixels.

9. The computer-implemented method of claim 6, further comprising:
calculating at least one of a weight for directionality, a weight for smoothness, or an overall weight for each radial component;
wherein recording the value of the radial component comprises recording the at least one weight with the value of the radial component as a pair according to each of the plurality of radii of each of the plurality of pixels.

10. The computer-implemented method of claim 9, estimating the bias for each of the plurality of radii comprising:
calculating at least one of a median value of a plurality of radial components; an average value of a plurality of radial components; a weighted median value of a plurality of radial components; or a weighted average value of a plurality of radial components.

11. One or more computer-readable storage media comprising instructions that are executable to cause a device to perform a process comprising:
automatically calculating a vignetting amount based on radial components of gradients collected from a logarithmic representation of an image;
inverting an attenuation corresponding to the vignetting amount in the image; and
outputting a corrected image.

12. The one or more computer-readable storage media of claim 11, wherein the image is an RGB image, the process further comprising:
converting the RGB image into a representation including a luma component, the luma component being utilized to automatically calculate the vignetting amount.

13. The one or more computer-readable media of claim 12, automatically calculating a vignetting amount based on radial components of gradients collected from a logarithmic representation of an image comprising:
for each of a plurality of pixels in the image, calculating a gradient field, the gradient field representing a local gradient;
calculating a radial component of the gradient field for each of the plurality of pixels;
calculating at least one confidence weight for the radial component for each of the plurality of pixels;
recording the radial component and the at least one confidence weight for each of the plurality of pixels according to a radius for each of the plurality of pixels, the radius for each of the plurality of pixels corresponding to a distance from an optical center of the image to each of the plurality of pixels; and
estimating a bias of a radial gradient for a plurality of radii.

14. The one or more computer-readable media of claim 13, estimating a bias of a radial gradient comprising:

calculating, for each of the plurality of radii, at least one of a median value of radial components recorded according to one of the plurality of radii; an average value of radial components recorded according to one of the plurality of radii; a weighted median value of radial components recorded according to one of the plurality of radii; or a weighted average value of radial components recorded according to one of the plurality of radii.

15. The one or more computer-readable media of claim 13, automatically calculating a vignetting amount based on radial components of gradients collected from a logarithmic representation of an image further comprising:

ascertaining a rotated pixel position corresponding to an initial position of one of the plurality of pixels, the initial position and rotated pixel position being in a first coordinate system;

calculating a difference of gradients, the difference of gradients being a difference between the gradient field at the initial position of the one of the plurality of pixels and a gradient field at the rotated pixel position;

rotating the calculated difference of gradients to be in a second coordinate system;

identifying a value of a tangential component of the calculated difference of gradients in the second coordinate system;

calculating at least one confidence weight for the tangential component; and recording the value of the tangential component and the at least one confidence weight with the values of the radial components recorded according to the radius for the one of the plurality of pixels.

16. The one or more computer-readable media of claim 15, estimating a bias of a radial gradient comprising:

calculating, for each of the plurality of radii, at least one of a median value of radial components and tangential components recorded according to one of the plurality of radii; an average value of radial components and tangential components recorded according to one of the plurality of radii; a weighted median value of radial components and tangential components recorded according to one of the plurality of radii; or a weighted average value of radial components and tangential components recorded according to one of the plurality of radii.

17. A device comprising:
one or more processors;
one or more computer-readable storage media; and
one or more modules embodied on the one or more computer-readable storage media and executable under the influence of the one or more processors, the one or more modules comprising an image processing module configured to:
receive an image;
convert the image into a logarithmic representation;
calculate a plurality of gradient fields; each gradient field being calculated at one of a plurality of pixels in the image;
collect a plurality of radial components; each radial component corresponding to one of the plurality of gradient fields calculated, wherein the radial components are collected according one of a plurality of radii; each one of a plurality of radii being a radius from an optical center of the image to a corresponding one of the plurality of pixels from which the one of the plurality of gradient fields was calculated at;
calculate at least one confidence weight corresponding to each of the plurality of radial components;
estimate a bias in the plurality of radial components for each of a plurality of radii;
apply a regression to a plot comparing the bias to the plurality of radii effective to determine an overall attenuation due to vignetting; and
invert the overall attenuation in the image effective to output a corrected image.

18. The device of claim 17, wherein the image is an RGB image, the image processing module being further configured to:
convert the RGB image into a representation including a luma component, the luma component being utilized to calculate a plurality of gradient fields.

19. The device of claim 17, wherein the at least one confidence weight is one of a weight for directionality, a weight for smoothness, or an overall weight for each radial component.

20. The device of claim 17, wherein the image processing module is configured to estimate a bias in the plurality of radial components for each of the plurality of radii by calculating, for each of the plurality of radii, at least one of a median value of radial components recorded according to one of the plurality of radii; an average value of radial components recorded according to one of the plurality of radii; a weighted median value of radial components recorded according to one of the plurality of radii; or a weighted average value of radial components recorded according to one of the plurality of radii.

* * * * *